United States Patent [19]
Dreifuerst et al.

[11] Patent Number: 5,434,770
[45] Date of Patent: Jul. 18, 1995

[54] HIGH VOLTAGE POWER SUPPLY WITH MODULAR SERIES RESONANT INVERTERS

[75] Inventors: Gary R. Dreifuerst; Bernard T. Merritt, both of Livermore, Calif.

[73] Assignee: United States Department of Energy, Washington, D.C.

[21] Appl. No.: 979,671

[22] Filed: Nov. 20, 1992

[51] Int. Cl.⁶ .......................................... H02M 3/315
[52] U.S. Cl. ...................................... 363/65; 363/27; 363/71; 363/136
[58] Field of Search .................. 363/27, 28, 39, 40, 363/41, 65, 71, 95, 96, 135, 136

[56] References Cited

U.S. PATENT DOCUMENTS

| | | | |
|---|---|---|---|
| 3,573,508 | 4/1971 | Harris | 307/284 |
| 3,646,395 | 2/1972 | DePratti | 315/242 P |
| 3,781,690 | 12/1973 | Corson | 328/67 |
| 4,075,537 | 2/1978 | Quillfeldt | 315/354 |
| 4,078,247 | 3/1978 | Albrecht | 363/136 |
| 4,245,194 | 1/1981 | Fahlen et al. | 331/94.5 |
| 4,275,317 | 6/1981 | Laudenslager et al. | 307/415 |
| 4,288,758 | 9/1981 | Seguin et al. | 331/94.5 |
| 4,398,156 | 8/1983 | Aaland | 328/233 |
| 4,494,236 | 1/1985 | Sutter, Jr. | 372/25 |
| 4,587,604 | 5/1986 | Nerone | 363/65 |
| 4,644,458 | 2/1987 | Harafuji et al. | 363/71 |

(List continued on next page.)

OTHER PUBLICATIONS

"The Use of Saturable Reactors As Discharge Devices For Pulse Generators" by W. S. Melville, Radio Section, Paper No. 1034, Sep. 15, 1950, pp. 185-207.

"High–Power Pulse Generation Using Semiconductors and Magnetic Cores" by Edward M. Lassiter, Paul R. Johannessen and Richard H. Spencer, AIEE Magnetic Amplifiers Committe, Paper 60-870, May 9, 1960, pp. 1-7.

"High–Power Semiconductor-Magnetic Pulse Generators" by Godfrey T. Coate, Laurence R. Swain, Jr., Research Monograph No. 39, The M.I.T. Press, Cambridge, Mass., Dec. 1966, pp. 1-7.

"Transformers" by James P. O'Loughlin, Air Force Weapons Laboratory, Pulsed Power.

Lecture Series, Lecture No. 18, Plasma and Switching Laboratory, Department of Electrical Engineering, Texas Tech University, Lubbock, Tex., Dec. 1979, pp. 10-13.

"Basic Principles Governing The Design of Magnetic Switches" by D. L. Birx, E. J. Lauer, L. L. Reginato, J.

(List continued on next page.)

*Primary Examiner*—Jeffrey L. Sterrett
*Attorney, Agent, or Firm*—Henry Sartorio; Miguel A. Valdes; William R. Moser

[57] ABSTRACT

A relatively small and compact high voltage, high current power supply for a laser utilizes a plurality of modules containing series resonant half bridge inverters. A pair of reverse conducting thyristors are incorporated in each series resonant inverter module such that the series resonant inverter modules are sequentially activated in phases 360°/n apart, where n=number of modules for n>2. Selective activation of the modules allows precise output control reducing ripple and improving efficiency. Each series resonant half bridge inverter module includes a transformer which has a cooling manifold for actively circulating a coolant such as water, to cool the transformer core as well as selected circuit elements. Conductors connecting and forming various circuit components comprise hollow, electrically conductive tubes such as copper. Coolant circulates through the tubes to remove heat. The conductive tubes act as electrically conductive lines for connecting various components of the power supply. Where it is desired to make electrical isolation breaks, tubes comprised of insulating material such as nylon are used to provide insulation and continue the fluid circuit.

14 Claims, 8 Drawing Sheets

U.S. PATENT DOCUMENTS

| | | | |
|---|---|---|---|
| 4,674,022 | 6/1987 | VerPlanck | 363/57 |
| 4,677,636 | 6/1987 | Laudenslager et al. | 372/68 |
| 4,695,933 | 9/1987 | Nguyen et al. | 363/71 |
| 4,698,518 | 10/1987 | Pacala | 307/106 |
| 4,734,924 | 3/1988 | Yahata et al. | 378/118 |
| 4,751,472 | 6/1988 | Knobbe et al. | 330/127 |
| 4,779,022 | 10/1988 | Badenhoop et al. | 313/37 |
| 4,814,965 | 3/1989 | Peterson | 363/65 |
| 4,825,272 | 4/1989 | Lehmann | 357/38 |
| 5,019,954 | 5/1991 | Bourgeault et al. | 363/71 |
| 5,105,351 | 4/1992 | Harada et al. | 363/65 |
| 5,189,602 | 2/1993 | Callier et al. | 363/95 |

OTHER PUBLICATIONS

Schmidt and M. Smith, Nov. 18, 1980—UCD–18831, Lawrence Livermore Laboratory, pp. 1–25.

"The Application of Magnetic Pulse Compression To the Grid System of the ETA/ATA Accelerator" by D. L. Birx, E. G. Cook, L. L. Reginato, J. A. Schmidt, M. W. Smith, Lawrence Livermore National Laboratory, Dec. 1982 IEEE, pp. 10–13.

"Fast Switching Thyristors Replace Thyratrons in High–Current Pulse Applications", Brown Boven Review Jul. 1987, pp. 401–408.

"Power Semiconductor Devices For Sub–Microsecond Laser Pulse Generation", by J. Vitins, J. L. Steiner, A. Schweizer and H. Lawatsch, Asea Brown Boveri Ltd., Dec. 1988 IEEE, pp. 299–306.

"High di/dt Switching With Thyristors", by J. L. Hudgins, V. A. Sankaran, W. M. Portnoy and K. M. Marks, Department of Electrical and Computer Engineering, University of South Carolina, Columbia, S.C., Dec. 1988 IEEE, pp. 292–298.

"High Average Power Magnetic Modulator For Copper Lasers", E. G. Cook, D. G. Ball, D. L. Birx, J. D. Branum, S. E. Peluso, M. D. Langford, R. D. Speer, J. R. Sullivan, and P. G. Woods, Jun. 14, 1991, UCRL–JC–105816 Preprint, Lawrence Livermore National Laboratory, pp. 1–6.

"Reliable, High Repetition Rate Thyratron Grid Driver used With A Magnetic Modulator", by James V. Hill, Don G. Ball, and D. N. Garrett, Jun. 14, 1991, UCRL–JC–105815 Preprint, Lawrence Livermore National Laboratory.

"Digest of Technical Papers", Eighth IEEE Internatinoal Pulsed Power Conference, Sheraton Harbor Island East Hotel, San Diego, Calif., Jun. 16–19, 1991, pp. 191–195.

Reverse Conducting Thyristors Replace Thyratrons in Sub–Microsecond Pulse Generation, J. Vitins (member IEEE), J. L. Steiner & A. Schweizer—BBC Brown Boveri Ltd., Dec. 1987, pp. 591–594.

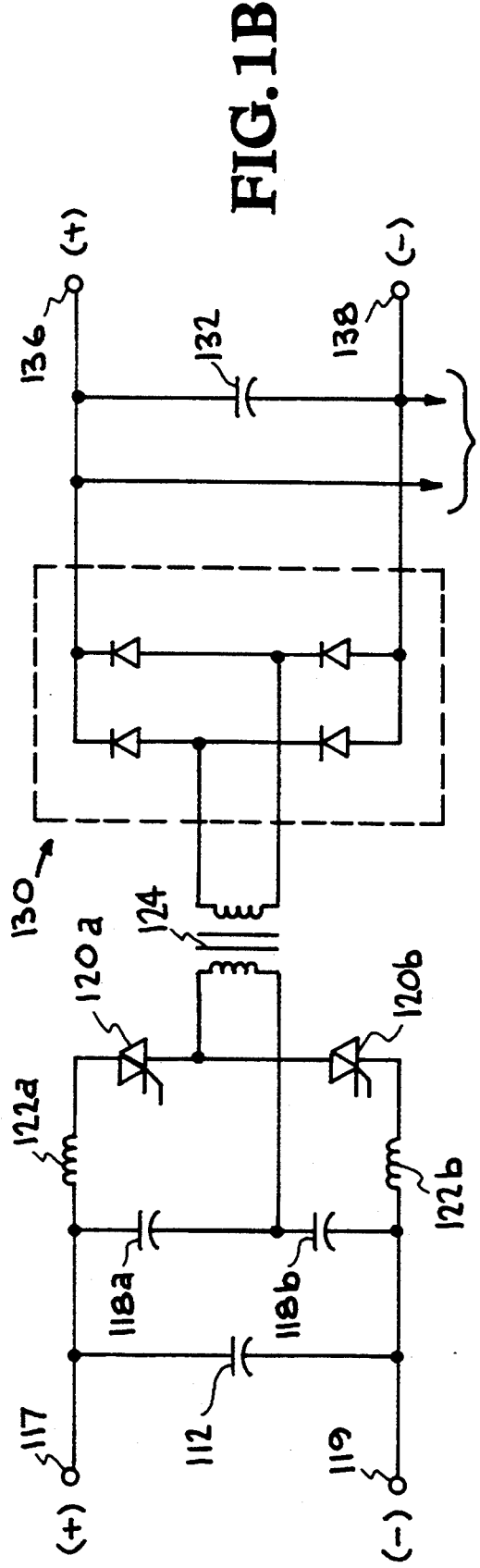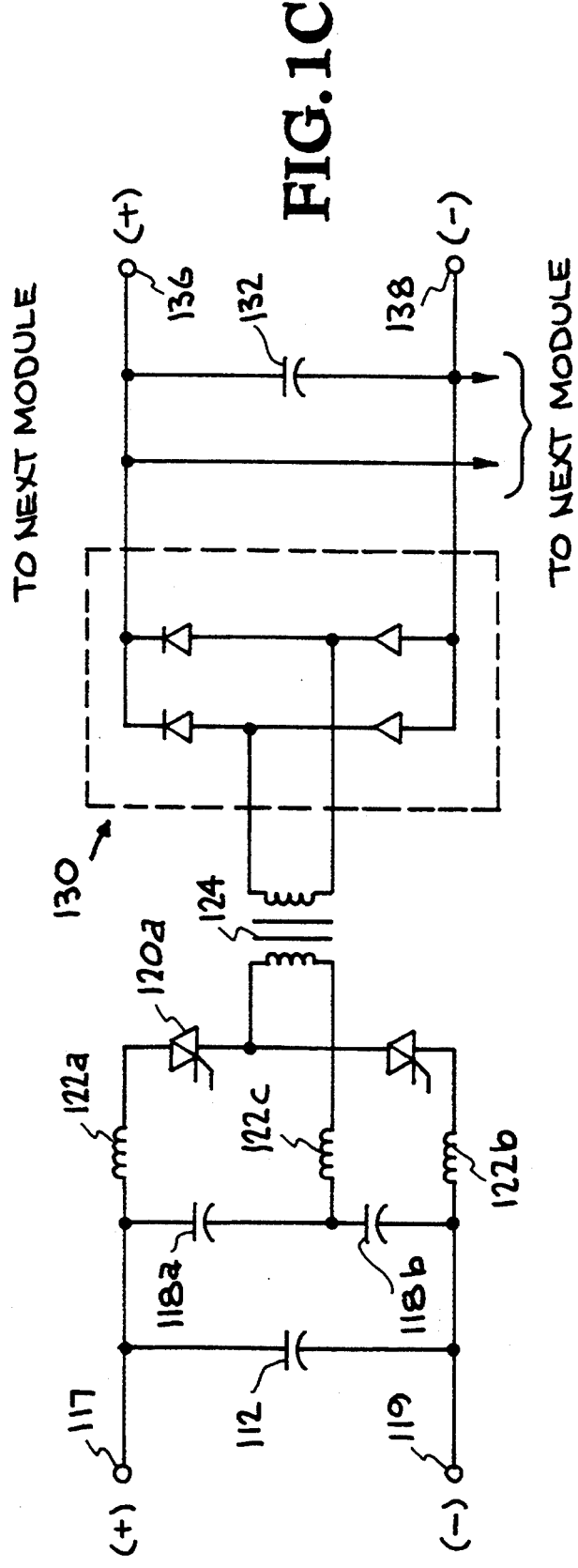

HIGH VOLTAGE POWER SUPPLY WITH MODULAR SERIES RESONANT INVERTERS

STATEMENT OF RIGHTS TO THE INVENTION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field Of The Invention

The field of the present invention relates to high voltage, switched mode power supplies. More particularly, the field of the present invention relates to a high voltage power supply incorporating a plurality of phase controlled series resonant half bridge inverters for minimizing harmonic distortion and for maximizing high voltage and current output.

2. Description of the Related Art

High power lasers such as those used in atomic vapor laser isotope separation (AVLIS) require power supplies capable of delivering substantial voltage (~700 volts) at substantial current (~200 amps), or on the order of 150 kW. Ideally, such power supplies would have fixed voltage output which does not vary under load and is free of ripple.

Conventional power supplies often are inadequate to the task. First, such power supplies are often operated from three phase current source and therefore have significant amounts of 360 Hz ripple on their outputs.

Second, conventional power supplies generally use thyristors operating at line frequency, or about 60 Hz. Thyristors are used to generate pulses of current into a large transformer that operates conventionally at low frequency, for example 60 Hz. Thyristors switch off and on to regulate the rectified voltage output on the secondary winding of the transformer. This distorts the line current feeding the thyristor regulator circuit by inducing current pulses or surges. Thus conventional power supplies have the disadvantage of large surges in current on the lines to the thyristor regulator circuit. These current surges cause increased line losses and resistive losses in the lines feeding the power control circuit.

Third, thyristors in conventional power supplies are conducting for only a portion of each half sine wave of the line voltage. The current only flows for a portion of the input half sine wave. That is, current only flows for a portion of the time, when output power is fixed. The input current must go to higher peak values to maintain the output power. This, again, causes increased power losses due to current; distortions on the input lines.

Fourth, in those conventional power supplies which have attempted to overcome current distortion on input lines by eliminating the use of thyristors and instead using a large vacuum tube rectifier and/or a vacuum tube tetrode on the secondary side as a series pass regulator, the vacuum tube tetrode acts as a variable resistance in series with a load to maintain a constant voltage across the load. Because the control element is in series with the load being driven, losses occur which produce inefficiency in the system. The control element dissipates power because a voltage develops across the control element while current is flowing through it. Such a conventional power supply causes a loss inside the vacuum tetrode itself and results in low efficiency. The power ratio, or efficiency, of such a power supply would only be around 50–60%.

In an effort to gain efficiency, many switched mode power supplies eliminate the series pass element (tetrode regulator). Conventional switched mode power supplies also may eliminate the large transformer operating at 60 Hz. This is done by using FETs or other switches and switching the FETs on and off at high frequency to develop a high frequency ac voltage on the primary of a smaller transformer. The ac voltage on the primary is intended to produce a larger voltage on the secondary side which can be rectified to produce a high voltage dc output.

There is a need, therefore, for an improved solid state high power switched mode power supply having improved efficiency, reduced power losses and which is capable of supplying a constant highly regulated output. There is also a need in such a power supply for an improved heat dissipation system.

FETs operate at high frequencies and need only a small voltage and a current of approximately 100 microamps to turn on. However, switched mode power supplies incorporating FETs are not practical for high power applications such as in an AVLIS process because of the low power ratings of commercially available FETs.

The FETs also dissipate significant amounts of power in the conducting state. When the currents are high, the resistance of the FETs from drain to source causes a significant voltage drop from drain to source. This voltage drop may represent a significant dissipation of power.

In conventional switched mode power supplies, problems also arise due to increased harmonic distortions of the input current waveform at line frequency. Harmonic distortions of the current waveform at line frequency cause increased power dissipation in transmission lines feeding the power supply input. Switching frequency harmonics are also radiated as noise.

Conventional switched mode power supplies also have problems in dissipating heat which builds up in many of the components. For example in a laser isotope separation process, some components, for example diodes, carry 50 kw of power at 700 volts, or approximately 70 amps. Conventional switched mode power supplies lack efficient heat dissipation means for providing adequate cooling of these components. This results in a decrease in reliability and a shorter useful life for the power supply.

Conductors are frequently expected to carry hundreds of amperes RMS without inordinate heat buildup. Conventional power supplies frequently lack sufficient heat dissipating means to prevent damage in such high power applications.

SUMMARY OF THE INVENTION

According to a first aspect of the present invention, a novel power supply uses a multiphase ac input voltage, input rectifiers and an input filter which includes at least one capacitor to produce an intermediate dc voltage. The intermediate dc voltage is applied to a plurality of modular series resonant half bridge inverters ("modules") connected in parallel. Any number of such modules may be so connected for easy power scaling. Each series resonant inverter acts as a current source. A novel control scheme for selectively activating selected ones of the modules reduces voltage "ripple" (rectifier artifact and switching harmonics) in both the input and output filters and thus in the output of the supply. Current requirements for the filters are minimized when an odd number of modules are used. The output of the modules is applied to the primary of an output transformer. A higher voltage is available at the secondary of the transformer and is rectified by an output rectifier and filters by an output filter and then applied to a load. The output filter includes at least one capacitor.

In accordance with another aspect of the invention, a pair of reverse conducting thyristors (RCTs) are incorporated in each module and the modules are sequentially activated in phases $360°/n$ apart, where n=number of modules for n>2. This phase control of the modules further reduces current distortions (or "surges") in the input and output dc filter capacitors, thus advantageously enabling the use of smaller capacitors.

In accordance with another aspect of the present invention, the modules are designed for ease of maintenance. A dc filter is provided on a circuit card assembly. The series resonant half bridge switches are integrated with a separate circuit card assembly for triggering. This advantageously enables a faulty module to be replaced simply and efficiently without a long or complicated repair time.

In accordance with yet another aspect of the present invention, a novel heat dissipation system is provided. Each module includes a transformer which has a cooling manifold for actively circulating a liquid coolant (such as water) to cool the transformer core as well as selected circuit elements. Here, electrical conductors connecting various circuit components comprise hollow, electrically conductive tubes (such as copper tubes). The coolant circulates through the electrically conductive tubes and serves to carry away heat. The windings of the transformers also comprise coolant filled electrically conductive tubes for carrying away excess heat.

In accordance with another aspect of the invention, where it is desired to make electrical isolation breaks, tubes comprised of insulating material such as nylon may be used to provide electrical insulation. The coolant continues to circulate throughout the complete fluid circuit. In comparison with conventional devices, the present invention provides extremely effective high heat dissipation. This aspect of the present invention enables the power supply to be small and compact. At the same time, the increased heat dissipation characteristics in accordance with the present invention make the present power supply suitable for high power applications such as an AVLIS process, where the power supply must produce a stable high voltage, high current output under an extreme load without overheating.

Accordingly, it is an object of the present invention to provide an improved high voltage, high current switched mode power supply. Other and further objects and advantages will appear hereinafter.

BRIEF DESCRIPTION OF THE DRAWINGS

FIG. 1B is a schematic diagram of an alternative embodiment of a series resonant inverter module in accordance with a preferred embodiment of the invention.

FIG. 1C is a schematic diagram of an alternative embodiment of a series resonant inverter module in accordance with a preferred embodiment of the invention.

DETAILED DESCRIPTION OF THE PREFERRED EMBODIMENTS

According to a preferred embodiment of the present invention, a switched mode power supply is provided which has a greatly increased useful lifetime and increased reliability in comparison with other conventional or switched mode power supplies. The resonant capacitors are capable of handling 1300 volts ac and have a useful lifetime in the neighborhood of 40,000 hours. The output capacitors are capable of handling 700 volts dc and have a 30,000 hour expected useful lifetime. The output of the present power supply is typically 700 volts dc at 150 kw, and has a $\pm 1\%$ regulation against line and load in the range of 400–700 volts dc. In a range of 0–400 volts dc, the power supply exhibits a $\pm 5\%$ regulation against line and load. The features of the present invention also provide an extremely light weight and compact construction for the power supply. In a preferred embodiment of the present invention a power supply capable of delivering at least 150 kw of filtered and regulated dc power from a conventional three phase ac source fits inside an aluminum enclosure of dimensions 21.5" (H)$\times$24.5" (W)$\times$46" (L). This is 24,230.5 cubic inches. The power supply according to a preferred embodiment weighs 480 pounds. In addition, the use of series resonant inverters as separate, stackable, modules fabricated with circuit card assemblies enables the apparatus to be quickly customized to provide additional high power output for driving a particular load. The modular structure also greatly adds to the flexibility, ease of repair and variety of uses to which this device may be applied.

Figure 1A:
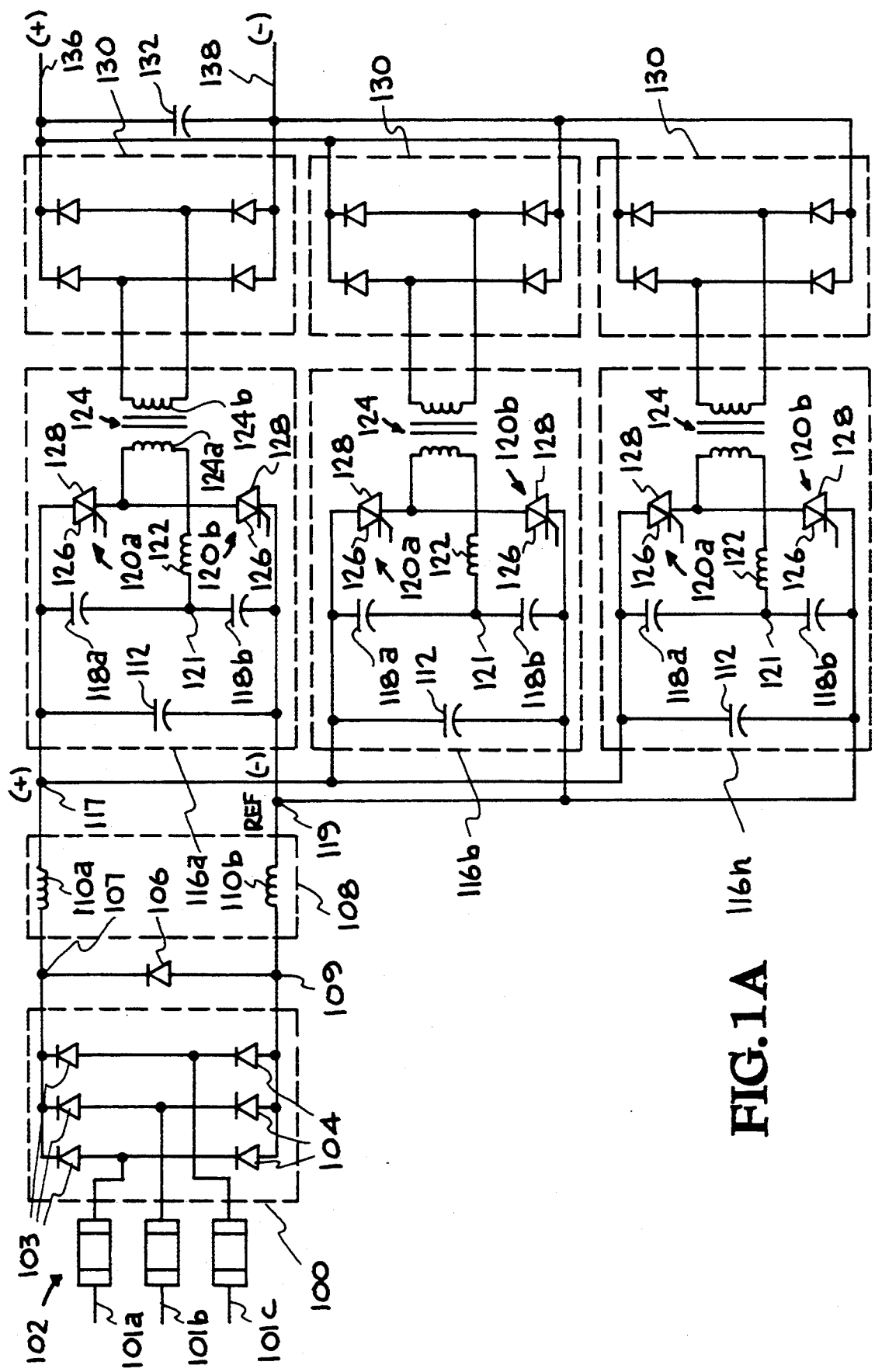
FIG. 1A is a schematic diagram of a power supply incorporating three series resonant inverter modules according to a preferred embodiment of the invention.

Referring now to FIG. 1A, an input voltage, typically three phase, 480 volts ac, is applied to a full wave half bridge 100 (hereinafter sometimes referred to as "input rectifier") through lines 101a, 101b, and 101c, respectively. The fuses 102 prevent an overload of the circuit. The full wave half bridge 100 comprises a three phase rectifier which converts the multiphase ac input on lines 101a, 101b, and 101c into a dc voltage across nodes 107 and 109. The full wave half bridge 100 is comprised of a plurality of parallel-connected silicon controlled rectifiers (SCRs) 103 each having its anode connected to the cathode of a respective diode 104. The rectification of the three phase ac input by the full wave half bridge 100 takes place in a well-known manner. The clamping diode 106 across nodes 107 and 109 prevents negative voltage spikes which may be caused by current surges through the inductors 110a and 110b which are connected to nodes 107 and 109 respectively. The clamp diode 106 also prevents voltage reversals at nodes 107 and 109 which may otherwise be caused by a sudden decrease in the current demand of the inverter modules 116a through 116n.

The rectified dc voltage is then applied to a low pass dc filter 108 (hereinafter sometimes referred to as "input filter") comprising filter inductors 110a and 110b. As is well known to those skilled in the art, capacitor 112 is a distributed filter capacitance placed across input nodes of each module which also serves to filter the dc voltage. Filter 108 and capacitor 112 remove substantially all ac components from the input rectified voltage in a well-known manner.

In accordance with one aspect of the invention, a plurality of series resonant half bridge inverter modules 116a through 116n are each fabricated from separate circuit card assemblies, separate magnetic components and mechanical mounting parts. These modules are connected together in parallel. Each series resonant inverter module 116a through. 116n comprises a separate circuit connected in parallel for receiving a positive voltage input from node 117 and a negative voltage input from node 119, respectively. Each series resonant inverter module 116a through 116n acts as a current source. The control system staggers the triggering of the modules, thus substantially preventing harmonic distortion or "ripple" which includes ac voltage components and harmonic voltage components related to the base switching frequency (described below).

Three series resonant inverter modules 116a through 116n are shown. However, any desired number of series resonant inverter modules 116 may be connected together in parallel. This advantageously enables the power output be easily scalable up to 150 kw or more. Preferably, an odd number of series resonant inverter modules are linked together in a modular assembly. It has been found that an odd number of series resonant inverter modules 116a through 116n is more effective in cancelling undesirable harmonics of switching frequencies on power components. For example, nine series resonant inverter modules could be linked together in parallel to provide an extremely high power output.

The operation of each series resonant inverter module 116a through 116n is the same. For the sake of simplicity, the operation of one module, 116a is described. Each inverter module 116a comprises a filter capacitance 112 feeding two capacitors 118a, 118b connected in series with one lead of capacitor 118a and one lead of capacitor 118b connected to a common node 121. One lead of capacitors 118a and 112 is connected with a positive voltage node 117 from the DC filter 108. One lead of capacitors 118b and 112 is connected with the negative voltage node 119. An inductor 122 is connected with node 121 between the series connected capacitors 118a and 118b and with one lead at the primary 124a transformer 124.

In accordance with one aspect of the invention, each series resonant inverter module 116a comprises two reverse conducting thyristors (RCTs) 120a and 120b connected in series. Each RCT 120a and 120b comprises a silicon controlled rectifier (SCR) 126 and an anti-parallel diode 128 combined on the same substrate. Each portion of the RCT 120a, 120b which comprises the silicon controlled rectifier 126 includes an anode (A), a cathode (C) and a control gate (G). The reverse conducting thyristors 120a, 120b are characterized by fast recovery times and only hold voltage in a forward direction. The RCTs 120a, 120b have ratings of 1300 volts hold-off in nonconducting mode and 20 microsecond $\mu s$ ($10^{-6}$) recovery time, that is, recovery to the blocking state after conducting. The cathode of RCT 120a is connected to the anode of RCT 120b. The anode of RCT 120a is connected to the positive side of capacitor 118a. Similarly, the cathode of RCT 120b is connected to the negative side of capacitor 118b. The cathode of RCT 120a and anode of RCT 120b are connected to one lead of the primary 124a of transformer 124. The second lead of the primary of transformer 124 is connected to the circuit node between series connected capacitors 118a and 118b through inductor 122.

As shown in FIG. 1B, an alternate embodiment for inductor 122 is to split this inductor into two units: 122a & 122b. Inductor 122a would be located between capacitor 118a and RCT 120a; the inductor 122b would be located between capacitor 118b and RCT 120b. The node 121 would electrically connect directly to transformer 124.

Figure 3:
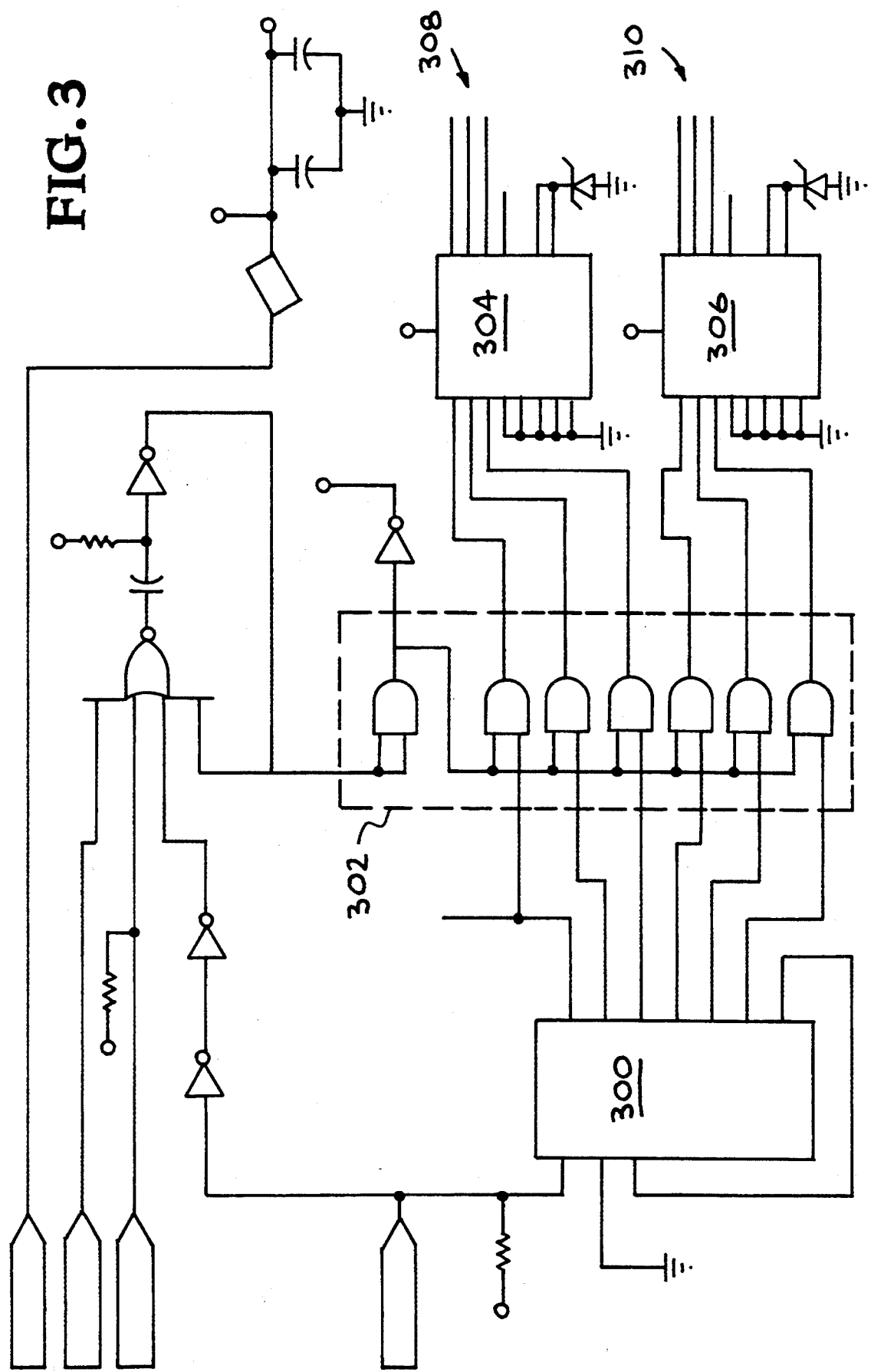
FIG. 3 is a schematic diagram of one portion of the control circuit for sequentially activating the series resonant inverters in accordance with the present invention.

A control circuit, shown in FIG. 3 activates the RCTs 120a and 120b by alternately applying a trigger pulse to the respective control gates. Each series resonant inverter module 116a through 116n is also sequentially turned on in a phase ,controlled relationship for reduction of harmonics. In operation, the RCTs 120a and 120b in series resonant inverter module 116a are triggered. The RCTs 120a and 120b of the next inverter module 116b are turned on by the trigger pulse at one-third (1/n) of the resonant cycle later with respect to inverter module 116a. The next successive :series resonant inverter module 116n is turned on at two-thirds (2/n) of the resonant cycle of inverter module 116a.

Thus, in accordance with this aspect of the invention, the RCTs 120a, 120b in each series resonant inverter module 116a through 116n are activated by a control signal in a sequential phase relationship, each resonant inverter module being activated 1/n of the resonant cycle out of phase with the previous series resonant inverter module. The phase controlled activation of the RCTs in the inverter modules has been found to minimize harmonic currents in the dc capacitor 112 and also enables the dc capacitor 112 to be much smaller than in a conventional power supply. The multiple phasing of inverter modules advantageously results in reduced ripple voltage throughout the power supply.

As each RCT 120a and 120b is alternately activated in phased relationship by a control pulse, this causes voltages of opposite polarity to appear across the inductor 122 and across the primary 124a of transformer 124. The inductor 122 connects with the primary winding 124a of transformer 124 and the midpoint of the series connected capacitors 118a, 118b. As each RCT 120a, 120b is turned on by a pulse of short duration, the respective RCT latches into a conducting state and current flows from capacitor 118a, for example, through RCT 120a, through the primary 124a of transformer 124 and then through inductor 122 and back to the opposite plate of capacitor 118a. The respective RCT 120a will stay on until the voltage reverses. The RCT 120a is turned off by a voltage reversal and the charge is then swept out of the SCR portion 126 of the RCT 120a.

The secondary winding 124b of transformer 124 is connected through a well-known full wave rectifier bridge assembly 130 (sometimes referred to herein as "output rectifier") to an output capacitor 132 that is parallel charged by each series resonant inverter module 116a through 116n.

The output capacitor 132 provides a reflected capacitance at the primary of transformer 124. The reflective capacitance of output capacitor 132 is extremely large and looks like a constant voltage. The two capacitors 118a, 118b form a resonant circuit with inductor 122. The output capacitor 132 is connected across the positive output lead 136 and the negative output lead 138 of the power supply and leads 136, 138 are adapted for connection to the load (a metal vapor laser modulator in a preferred embodiment).

The purpose of the RCTs is to produce an ac voltage and current at high frequency. It will be appreciated that the employment of RCTs in the present invention enables the ac frequency to be much higher than the line frequency. This also advantageously enables transformer 124 to be made smaller and with much less expense in comparison to a conventional 60 Hz power supply. The present power supply is not limited to the use of RCTs. Alternatives to RCTs which also may be employed in the present device include insulated gate bipolar transistors (IGBTs,) discrete silicon controlled rectifiers (SCRs) and diodes, a power transistor and diode, or a closing switch with diodes.

In accordance with another aspect of the present power supply, each series resonant inverter module 116a through 116n acts as a current source. The primary winding 124a of transformer 124 is connected from inductor 122 to the cathode lead of RCT 120a. The primary winding 124a is inductively coupled to the secondary winding 124b of transformer 124. The secondary coil has first and second output leads, each connected to a portion of the output rectifier 130. The alternate activation of the pair of switch means, RCTs 120a, 120b (sometimes referred to herein as "switches") induces a voltage of alternating polarity across the output leads of the secondary coil that is current limited due to the current limiting action of the resonant circuit. The resonant circuit comprises the inductance of inductor 122, the leakage inductance of transformer 124 referred to the primary winding in series with capacitor 118. The resonant inverter modules acting as current sources are connected together in parallel providing an easy means for power scaling.

The alternate activation of the pair of switches 120a, 120b in each series resonant inverter module induces a voltage of alternating polarity across the output leads of the secondary winding 124b of transformer 124 that is current limited. This is due to the current limiting action of the resonant circuit as described above.

In accordance with another aspect of the invention, each series resonant inverter module 116a through 116n, can be shut down simultaneously in response to an excessive current being drawn from the output terminals of the supply during an output short or arc across the supply output in order to provide overcurrent protection. Similarly, each series resonant inverter module can be shut down simultaneously if the output voltage rises above a predetermined value to provide overvoltage protection for the entire supply.

The overcurrent protection is accomplished by comparing the output current with a current reference level in a fast comparator (not shown); similarly, overvoltage protection is accomplished by comparing the voltage output of a voltage divider connected across the supply output with a voltage reference level in a fast comparator (not shown). These fast comparators allow the inverter modules to be shut down with a minimum of delay. This greatly reduces the chance of damaging the RCTs and rectifier diodes during overvoltage or overcurrent conditions. The current and voltage references can be controlled by computer and easily adjusted for the different loads placed across the supply output in accordance with techniques which are well known.

Figure 2:
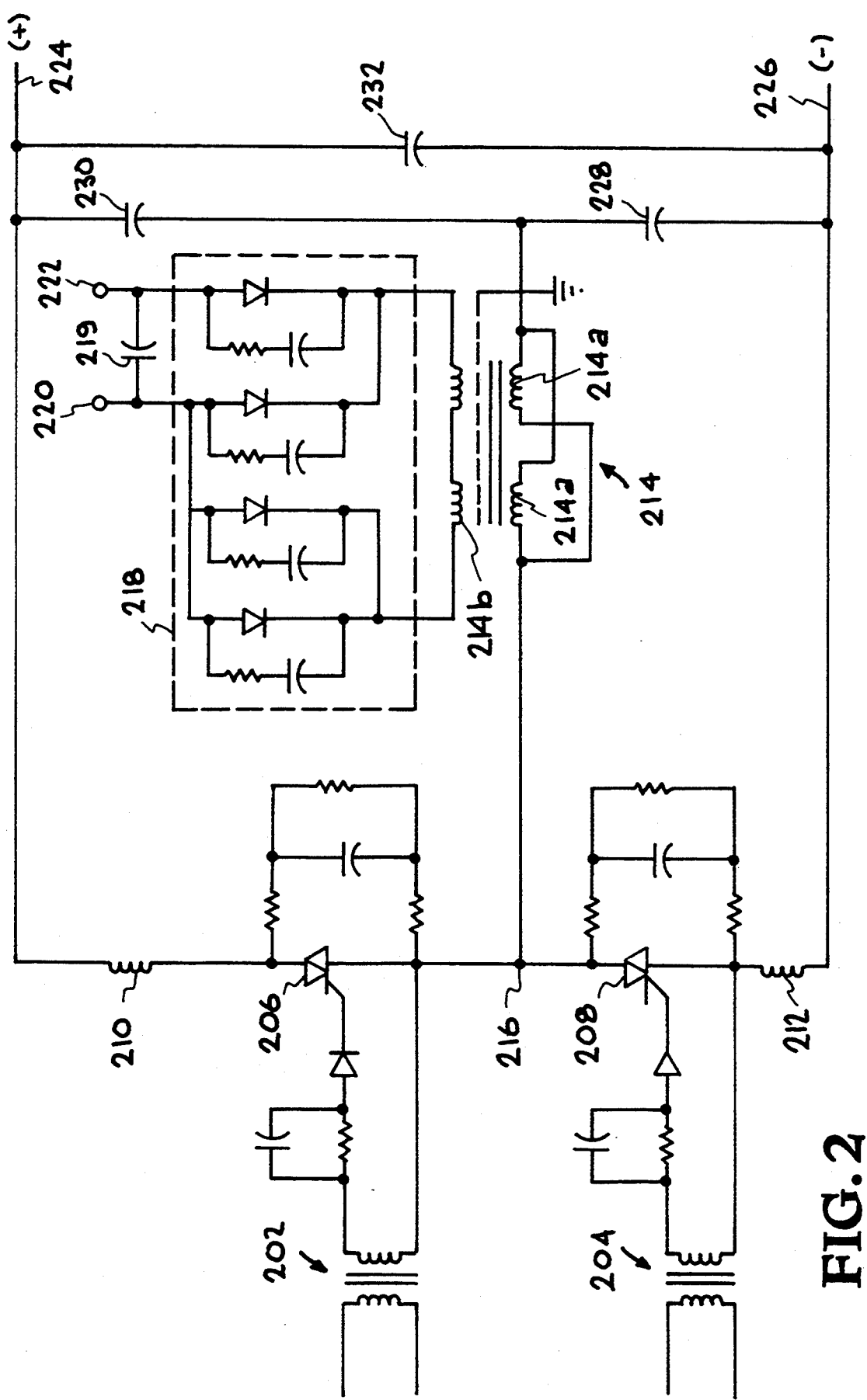
FIG. 2 is a schematic diagram of an alternative embodiment of a series resonant inverter module in accordance with a preferred embodiment of the invention.

FIG. 2 shows an alternate embodiment of the series resonant inverter module. Two transformers 202 and 204 produce pulses in accordance with well-known techniques for alternately activating RCTs 206, 208 respectively. The cathode of the SCR portion of each RCT is, conventionally, the cathode of the RCT. Thus, a first inductor 210 is connected to the anode of RCT 206 and a second inductor 212 is connected to the cathode of RCT 208. Similarly, the anode of RCT 208 is connected to the cathode of RCT 206. Transformer 214 has two primary windings 214a in parallel which act as a single winding. A node 216 between the series connected RCTs 206 and 208 has a connection with the primary 214a of transformer 214. The primary 214a of transformer 214 is inductively coupled to a secondary winding 214b which is in turn connected to output rectifier 218.

Output rectifier 218 has a positive and negative voltage output at leads 220 and 222 respectively. An output capacitor 219 connected between leads 220 and 222 would have its capacitance reflected to the primary of transformer 214. When one of the RCTs 206 or 208 is activated by the triggering transformers 202 or 204, current will flow from capacitors 230 or 228 through one of the inductors 210, or 212, depending on which RCT is activated. The positive and negative input line voltages to the inverter are shown at lines ("rails") 224 and 226 respectively. A large capacitor 232 is placed across the positive and negative input lines ("rails") 224 and 226. In a preferred embodiment of the invention capacitor 232 is a 2500 microfarad capacitor. Thus, when RCT 208 is conducting, current flows from capacitor 228 through inductor 212 through node 216 and into the primary of transformer 214. Capacitor 219 is placed across the positive and negative output leads 220, 222. Capacitor 219 presents a large reflected capacitance to the primary 214a of transformer 214. This is a resonant circuit which produces sinusoidal current pulses in the primary 214a of transformer 214. This in turn induces sinusoidal pulses in the secondary 214b of transformer 214 which are then rectified by output rectifier 218 to the DC output leads 220 and 222. In general, the value of the reflected capacitance is very large compared to capacitors 230 or 228 so that the resonant frequency is primarily determined by capacitors 230 or 228.

Figure 7A:
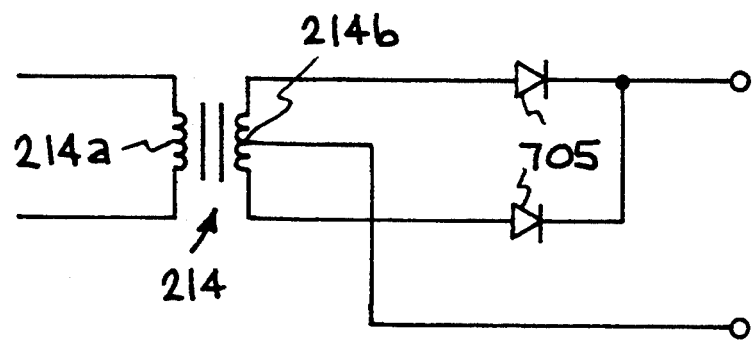
FIG. 7A is a schematic diagram of an alternative embodiment of the output rectifier.
Figure 7B:
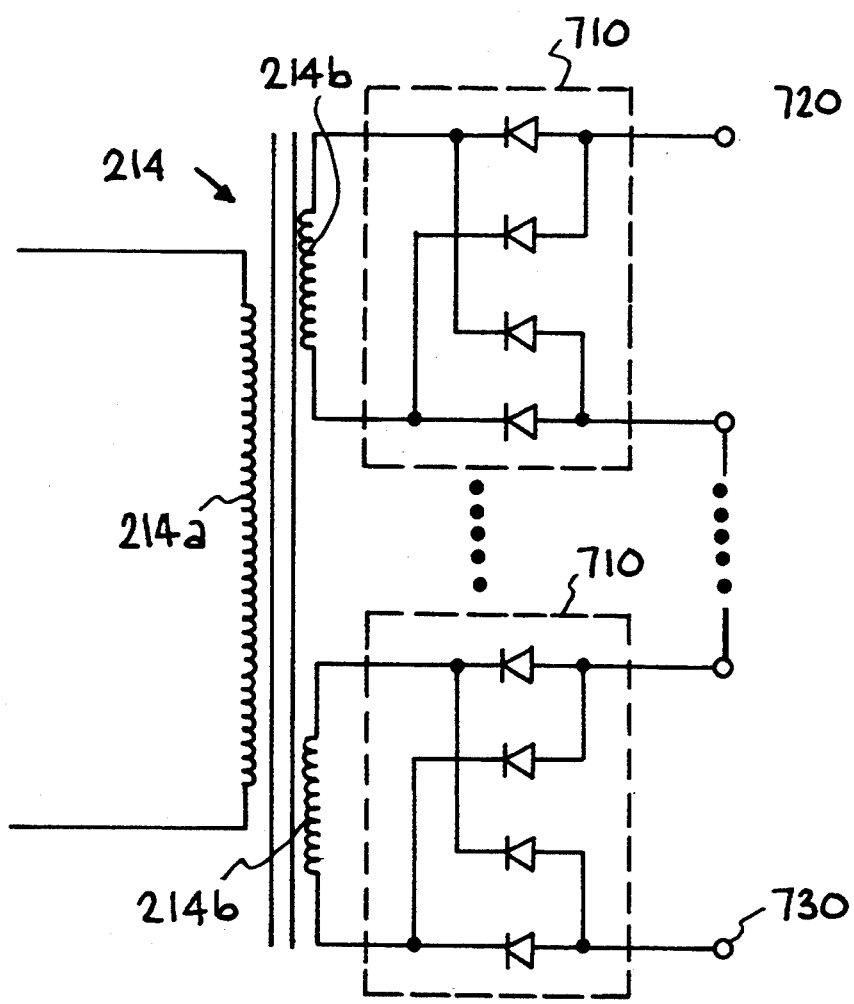
FIG. 7B is a schematic diagram of an alternative embodiment of the output rectifier.

FIGS. 7A and 7B depict two alternative embodiments for the output rectifier (218 in FIG. 2 and 130 in FIGS. 1, 1a and 1b). In FIG. 7A a transformer 214 having a center-tapped secondary winding 214b with full wave rectification provided by diodes 705 is shown. In FIG. 7b a multiple secondary configuration is shown. In this case, each of the secondaries 214b has a full wave rectifier assembly 710 and each assembly 710 is wired in series to form an output across lines 720 and 730.

Referring to FIG. 2, when RCT 206 is conducting, current flows from capacitor 230 through the primary 214a of transformer 214, through node 216 and through inductor 210 and back into capacitor 230. When RCT 208 conducts, capacitor 228 discharges through the primary 214a of transformer 214, RCT 208 and inductor 212 so that a sinusoidal current pulse is formed.

Inductor 212 acts to limit the rate of rise and fall of the current pulses from capacitor 228 that flow through RCT 208. Similarly, inductor 210 acts to limit the rate of rise and fall of the current pulses from capacitor 230 that flow through RCT 206. Since inductors 210 and 212 do not saturate, these current pulses are sinusoidal.

An alternative embodiment shown in FIG. 1C adds inductor 122c as a non-saturating device to the split inductor arrangement of FIG. 1A. Inductor 122c represents the leakage inductance of transformer 124 and/or a physically separate inductor. In this embodiment, inductor 122a may saturate after limiting the rate of rise of the current pulse from capacitor 118a while RCT 120a turns on. Similarly, inductor 122b may saturate after limiting the rate of rise of the current pulse from capacitor 118b while RCT 120b turns on. This embodiment allows the designer to optimize and separate the functions of voltage rate of rise protection, current rate of rise protection and frequency control of the current pulses. The current pulse wave shape may deviate from a sinusoid if inductors 122a and 122b saturate.

FIG. 3 shows a schematic diagram of the part of the inverter trigger generator which is used for the sequential phase controlled activation of the series resonant inverter modules shown in FIG. 1. In accordance with this aspect of the invention, a Johnson counter 300 keeps track of which series resonant inverter modules are in the conducting state and times the activation of each series resonant inverter module 116a through 116n such that each module conducts at sequential phase intervals of 360°/nA high frequency clock runs at n times the base frequency. In a preferred embodiment, the base switching frequency of the resonant circuit is approximately 25 kHz. The Johnson counter produces n (three) pairs of pulses in a well known manner. The pulses of each pair are 180° out of phase. The rising and falling edges of the pulses of one pair differs from the other two pair by 1/6or ½n of the period of the pulses, or by 60° for the case where 3 modules are used.

The pulses are in turn input into an AND gate bank 302. The output leads of the AND gate bank are in turn the input into two pulse forming integrated circuits 304 and 306. The AND gates 302 control the connections of the pulses to the pulse forming circuits 304, 306. The AND gates are enabled or disabled by the presence or absence of logic signals on the control inputs DC LATCH, MOD OFF, and INV CLOCK. The pulse forming circuits 304 and 306 each produce one output signal on a respective output lead for each input pulse. The output signal is a pulse of short controlled duration which appears on output leads 308 of pulse forming integrated circuit 304 and on output leads 310 of pulse forming integrated circuit 306, respectively. Each input pulse to the pulse forming integrated circuits 304 and 306 produces a corresponding output pulse of short duration on the positive going edge of each respective input pulse. The output pulses are then connected to drive transformer primaries (such as transformer 204 of FIG. 2) in a known manner such that each switch (RCT 120a, 120b) within a resonant inverter module is alternately activated. Also, the switches, RCT 120a, 120b, of any two resonant inverter modules 116a, 116b are activated in a phased relationship, 180° apart.

Figure 4:
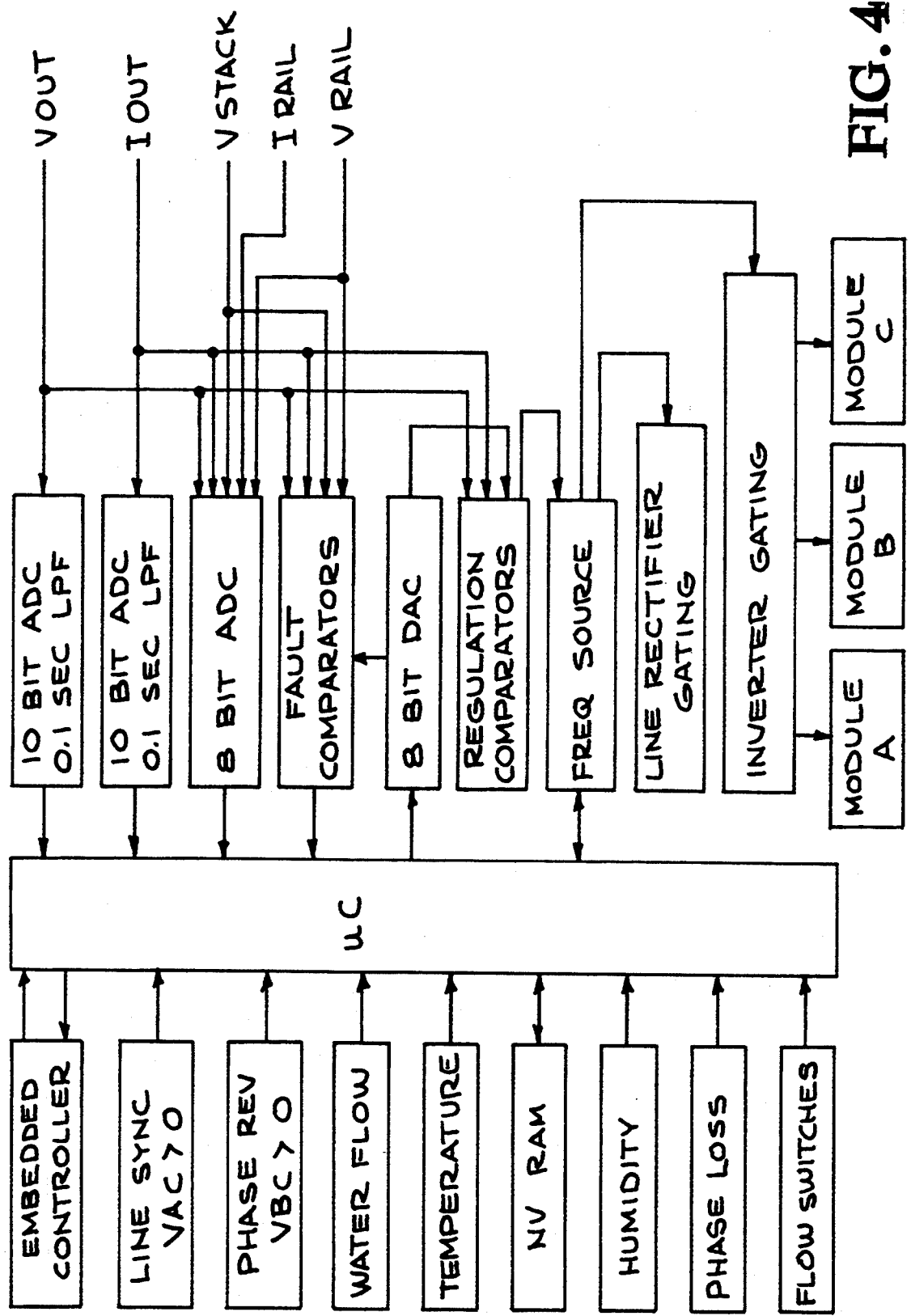
FIG. 4 is a block diagram of the control system for the sequential, phased activation of the inverter modules in accordance with the present invention.

FIG. 4 is a block diagram for a microcomputer based control system that operates the power supply. It receives instructions and reports status using a serial fiber optic communications link with embedded error detection. The power supply utilizes the microcomputer to monitor environmental changes and to program analog voltages that set the fast acting fault and regulation comparator loops. The parameters that are monitored include component temperatures, coolant temperatures, coolant flow status, operating voltages and currents, relative humidity, and the like. When measured values are out of acceptable ranges, appropriate action, such as shut down, may be initiated by the computer. The acceptable ranges will depend upon the actual application for the power supply and the environment in which the power supply is used. Such information is known to those of skill in the art and is therefore not further disclosed herein.

Figure 5:
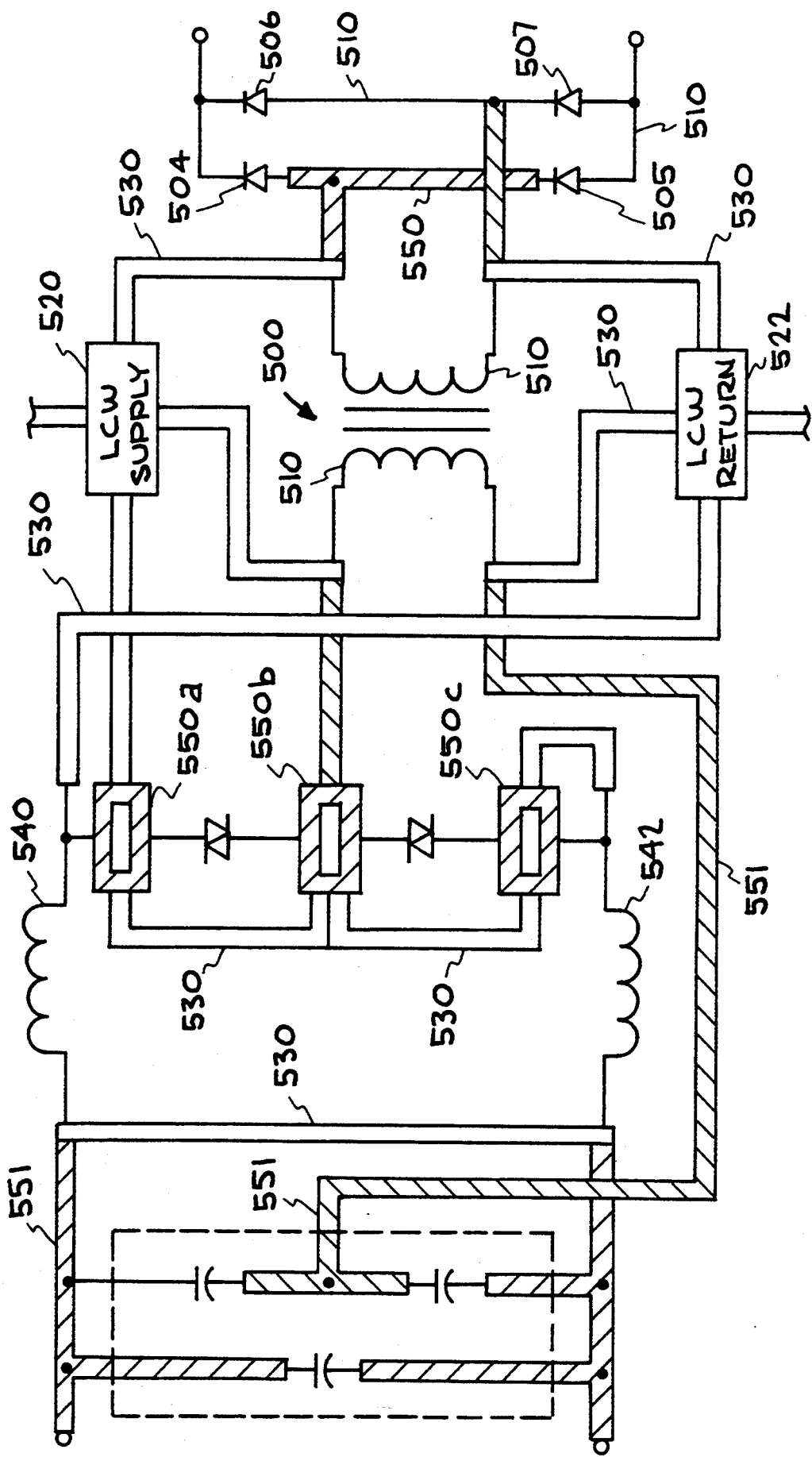
FIG. 5 is a schematic diagram of a heat dissipation system used in a preferred embodiment of the present invention showing the tubes which circulate coolant while providing electrical connections between selected components as well as other electrical functions.
Figure 6B:
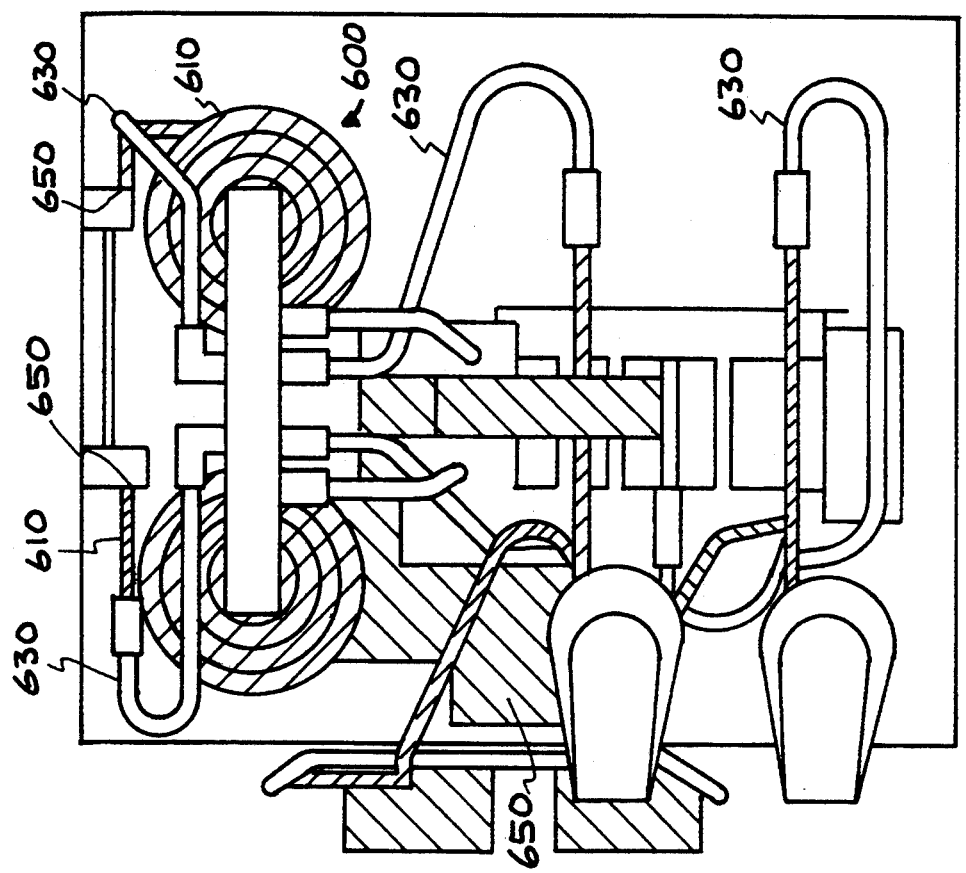
FIG. 6B is a top view of the inverter module of FIG. 6A.
Figure 6A:
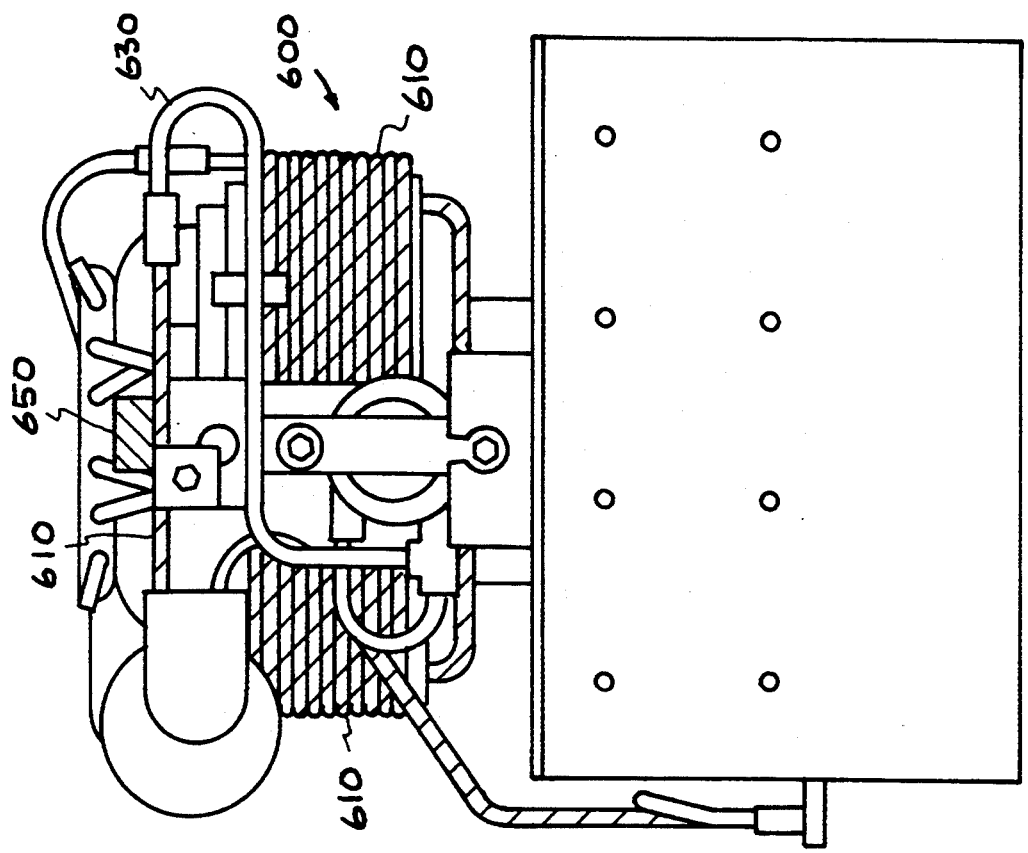
FIG. 6A is a perspective side view of one inverter module according to the present invention showing the heat dissipation system.

FIG. 5 shows a schematic view of a preferred heat dissipation system according to the present invention. As is shown, in FIGS. 5 6A and 6B, hollow coolant filled tubes comprise conductive means for selectively connecting various components of the power supply circuit. FIGS. 6A and 6B are perspective side and top views, respectively, showing additional details of the heat dissipation system.

When the present power supply is used in an AVLIS process, very high power on the order of a hundred thousand watts, may be involved. At power levels of thousands of watts, efficiency losses as low as three or four percent create a serious thermal issue; thus, adequate heat dissipation is essential. In the present power supply, conductors carry currents of hundreds of amperes RMS. Heat sinks such as are used in conventional power supplies are inadequate for dissipating heat when such large amounts of energy are being processed. In accordance with this aspect of the invention, conductors which connect circuit components comprise copper tubes or tubes consisting of any highly conductive material. A coolant such as water is actively circulated by a forced flow or pressure differential or other convenient means through the conductive tubes in order to effectively dissipate heat, developed from the power supply circuitry. At 150 kw output, water circulates at about 5 GPM (gallons per minute) according to a preferred embodiment.

In addition, each series resonant inverter module includes a built in manifold which circulates coolant such as water to the circuit elements. The coolant manifold is preferably placed on top of the transformer. The manifold structure preferably incorporates a coolant filled member or so called "cold finger" disposed around the transformer core, for effective dissipation of heat. The manifold also actively circulates the coolant through the conductive tubing which joins the various circuit elements.

The coolant manifold is preferably also comprised of a malleable conductive material such as copper in order to fit conformably over the core of the transformer.

Referring to FIG. 5, both the primary and secondary windings of the transformer 500 comprise coolant filled conductive tubes 510. A coolant such as water is forcibly circulated through the tubular windings in order to provide extremely efficient cooling of the transformer.

The diodes 504, 505, 506 and 507 in the series resonant inverter module also carry approximately 50 kW at 700 volts. The diodes 504, 505, 506 and 507 are cooled by means of the water circulating through conductive tubing which also connects the diodes with other circuit elements. The proximity of the coolant circulating through the conductive tubes has been found to effectively dissipate heat buildup in the diodes.

It will be appreciated that coolant is circulated throughout the circuit shown in FIG. 5 by being forcibly pumped or moved by pressure differential or other convenient means. The coolant is circulated from a supply portion of manifold 520 to a return portion of manifold 522.

At points where it is necessary to provide electrical isolation between circuit components, the coolant is circulated through insulated tubing 530 such as nylon, as shown. Insulated tubing 530 may be joined to electrically conductive tubing by SWAGE-LOCK TM fittings or similar connections as is well known in the art. Inductors 540 and 542 are comprised of coils of conductive tubing wrapped around magnetic material, then cast with a thermally conductive epoxy compound. Coolant is circulated through the tubing to efficiently dissipate heat generated in the conductor and the magnetic material. In other areas, copper bus bars 551 are provided to physically abut sections of coolant filled insulated tubes 530 which dissipate heat while providing electrical isolation.

RCT heat sinks 550a, 550b and 550c are interconnected by nonconductive tube 530.

Further details of the present system of heat dissipation are shown in FIGS. 6A and 6B. Primary and secondary windings of transformer 600 (a.k.a. 500 in FIG. 5 and 124 in FIGS. 1A, 1B and 1C) comprise wound copper tubes 610 which circulate coolant for efficient heat dissipation.

Bus bars 650 also proximately adjoin copper tubes 610 and nonconductive tubes 630 as shown in FIG. 6B. The proximity of the bus bar to the coolant filled tubes provides dissipation of heat which would otherwise be concentrated on the bus bar.

While embodiments and applications of this invention have been shown and described, it would be apparent to those skilled in the art that many more modifications are possible without departing from the inventive concepts herein. The invention, therefore, is not to be restricted except in the spirit of the appended claims.

We claim:

1. A power supply comprising:
   an input rectifier electrically connected to a positive rail and a negative rail,
   a dc filter electrically connected to said positive rail and said negative rail,
   a plurality of series resonant inverter modules electrically connected to said positive rail and said negative rail, each inverter module having:
   a positive input lead electrically connected to said positive rail;
   a negative input lead electrically connected to said negative rail;
   a filter capacitance electrically connected between said positive input lead and said negative input lead;
   a first capacitor having a first lead electrically connected to said positive input lead and a second lead electrically connected to a node;
   a second capacitor having a first lead electrically connected to said node and a second lead electrically connected to said negative input lead;
   at least a first and a second switch, each having an anode, cathode and gate, said anode of said first switch electrically connected to said positive rail, said cathode of said first switch electrically connected to said anode of said second switch, said cathode of said second switch electrically connected to said negative rail;
   a transformer including a primary winding having a first lead and a second lead and a secondary winding having a first lead and a second lead, said primary winding inductively coupled to said secondary winding, said first primary lead electrically connected to said cathode of said first switch, said primary lead electrically connected to said node; and
   an output rectifier electrically connected to said secondary winding and having a positive output lead and a negative output lead;
   an output filter electrically connected to each said output rectifier;
   control means for sequentially applying a control pulse to said gates of each of said switches for inducing a high frequency current into said secondary winding, said control means including means for sequentially activating successive ones of said plurality of series resonant circuit modules in a phase controlled relationship for minimizing ripple at said input filter and at said output filters; and
   further comprising for each said inverter module a first inductor inserted between said anode of said first switch and said positive rail and a second inductor inserted between said cathode of said second switch and said negative rail.

2. The power supply according to claim 1 wherein each of said switches comprises a silicon controlled rectifier and an antiparallel diode combined on the same substrate.

3. The power supply according to claim 1 further comprising an inductor inserted between said node and said second primary lead, 4. The power supply according to claim 3 further comprising a load capacitor having a first lead electrically connected to each of said positive output leads and a second lead electrically connected to each of said negative output leads.

5. The power supply according to claim 1 further comprising a load capacitor having a first lead electrically connected to each of said positive output leads and a second lead electrically connected to each of said negative output leads.

6. The power supply according to claim 5 further comprising an inductor inserted between each said node and each said second primary lead.

7. The power supply according to claim 6 further comprising a load capacitor having a first lead electrically connected to each of said positive output leads and a second lead electrically connected to each of said negative output leads.

8. The power supply according to claim 7 further comprising an inductor inserted between each said node and each said second primary lead.

9. The power supply according to claim 1 further comprising an inductor inserted between each said node and each said second primary lead.

10. The power supply according to claim 1 further comprising an inductor inserted between each said node and each said second primary lead.

11. A power supply comprising:

an input rectifier electrically connected to a positive rail and a negative rail, a dc filter electrically connected to said positive rail and said negative rail, a plurality of series resonant inverter modules electrically connected to said positive rail and said negative rail, each inverter module having:

a positive input lead electrically connected to said positive rail;

a negative input lead electrically connected to said negative rail;

a filter capacitance electrically connected between said positive input lead and said negative input lead;

a first capacitor having a first lead electrically connected to said positive input lead and a second lead electrically connected to a node;

a second capacitor having a first lead electrically connected to said node and a second lead electrically connected to said negative input lead;

at least a first and a second switch, each having an anode, cathode and gate, said anode of said first switch electrically connected to said positive rail, said cathode of said first switch electrically connected to said anode of said second switch, said cathode of said second switch electrically connected to said negative rail;

a transformer including a primary winding having a first lead and a second lead and a secondary winding having a first lead and a second lead, said primary winding inductively coupled to said secondary winding, said first primary lead electrically connected to said cathode of said first switch, said primary lead electrically connected to said node; and an output rectifier electrically connected to said secondary winding and having a positive output lead and a negative output lead; and for each series resonant inverter module a first inductor inserted between said anode of said first switch and said positive rail and a second inductor inserted between said cathode of said second switch and said negative rail.

12. The power supply according to claim 11 further comprising for each series resonant inverter module an inductor inserted between said node and said second primary lead.

13. The power supply according to claim 12 further comprising a load capacitor having a first lead electrically connected to each of said positive output leads and a second lead electrically connected to each of said negative output leads.

14. The power supply according to claim 13 wherein each of said switches comprises a silicon controlled rectifier and an antiparallel diode combined on the same substrate.

* * * * *